Inventor:
Ronald C. Kamp
By John W. Haines
Atty.

Inventor:
Ronald C. Kamp
By John W. Gaines
Atty.

United States Patent Office 3,422,802
Patented Jan. 21, 1969

3,422,802
PEDAL AND GOVERNOR OPERATED FUEL CONTROL FOR DUAL INDUCTION ENGINE
Ronald C. Kamp, Wilmette, Ill., assignor to International Harvester Company, Chicago, Ill., a corporation of Delaware
Filed June 7, 1967, Ser. No. 644,266
U.S. Cl. 123—75                                    13 Claims
Int. Cl. F02d 9/02, 31/00

ABSTRACT OF THE DISCLOSURE

Pedal and governor operated fuel control for a dual induction engine, in which the charge is non-homogeneously distributed in the combustion chamber, and into which the induction of that charge is effected in two stages, by a beginning fill of plain air on the suction stroke, and then by a completion fill of the chamber during the remainder of suction with a combustible quantity of fuel/air premixed by carburetion. The governor overcontrols or modulates action of the accelerator pedal at the right points for increasing, respectively, the vehicle acceleration, the fuel economy, particularly during deceleration and/or part power operation, and the braking capability of the engine when used in a vehicle.

---

My invention provides for improved operation of unthrottled engines of the type as generally disclosed in U.S. Patent No. 3,203,409/1965, the Otto Cycle Automobile Engine article by Lynwood Bryant appearing on pp. 102 to 112, Scientific Americal magazine, issue of March 1967, Swiss Patent No. 178,645/1935, and U.S. Patents Nos. 838,399/1906 and 3,170,445/1965. The invention particularly relates to dual induction engines of the type generally as shown in the latter three Patents Nos. 178,645/1935 (Swiss), 838,399 (U.S.), and 3,170,445 (U.S.), and to an improved fuel control especially adapted to operate such an engine for vehicular use.

According to practice in the past, internal combustion engines equipped with a dual induction system operate with an overall lean mixture. This lean operation is achieved in the operating cycle by filling the combustion chamber with plain air, all except for a portion of that chamber which is occupied by a volume of air/fuel mixture in which the ratio is within the relatively narrow limits forming a combustible mixture. The charge resulting from this non-homogeneous distribution is sometimes referred to as a stratified charge in the combustion chamber.

Increasing the proportion of combustible mixture compared to the balance consisting of plain air, or reducing such proportion causes a consequent increase or decrease of engine power. The plain air is usually inducted during the first part of the suction stroke and the combustible mixture readily achieved for example as a pre-mix accomplished by carburetion, is then inducted for the remainder of the suction stroke.

It has therefore been the practice to introduce the pre-mix as a finite but nevertheless small volume late in the suction stroke when the accelerator or fuel pedal is released. To increase that volume, the accelerator pedal is depressed to some point in the direction of the "wide open" or full power position and, to decrease the volume, the accelerator pedal is partially but not fully released to a position so as to cause deceleration.

One disadvantage has been an inherent sluggishness of response in the speed buildup of an engine to match the power setting of the accelerator pedal, and another disadvantage has been that, in order to prevent the engine from dying at the idle speed, idling quantity of fuel must be fed thereto during each pedal-release condition occurring when the engine is decelerating to idle. Also, engine braking has been practically nonexistent in unthrottled engines.

The foregoing disadvantages are materially reduced or substantially eliminated by my invention, which controls fuel under various circumstances to avoid or counteract the noted sluggishness on acceleration, to avoid the practice of feeding fuel during deceleration, to avoid part power inefficiencies in the engine which result from part throttle operation, and to avoid the practice of failing to provide engine braking during deceleration, all as will now be explained in detail. Features, objects, and advantages will either be specifically pointed out or become apparent when, for a better understanding of the invention, reference is made to the following description taken in conjunction with the accompanying drawings which show a preferred embodiment thereof and in which:

Figure 1:
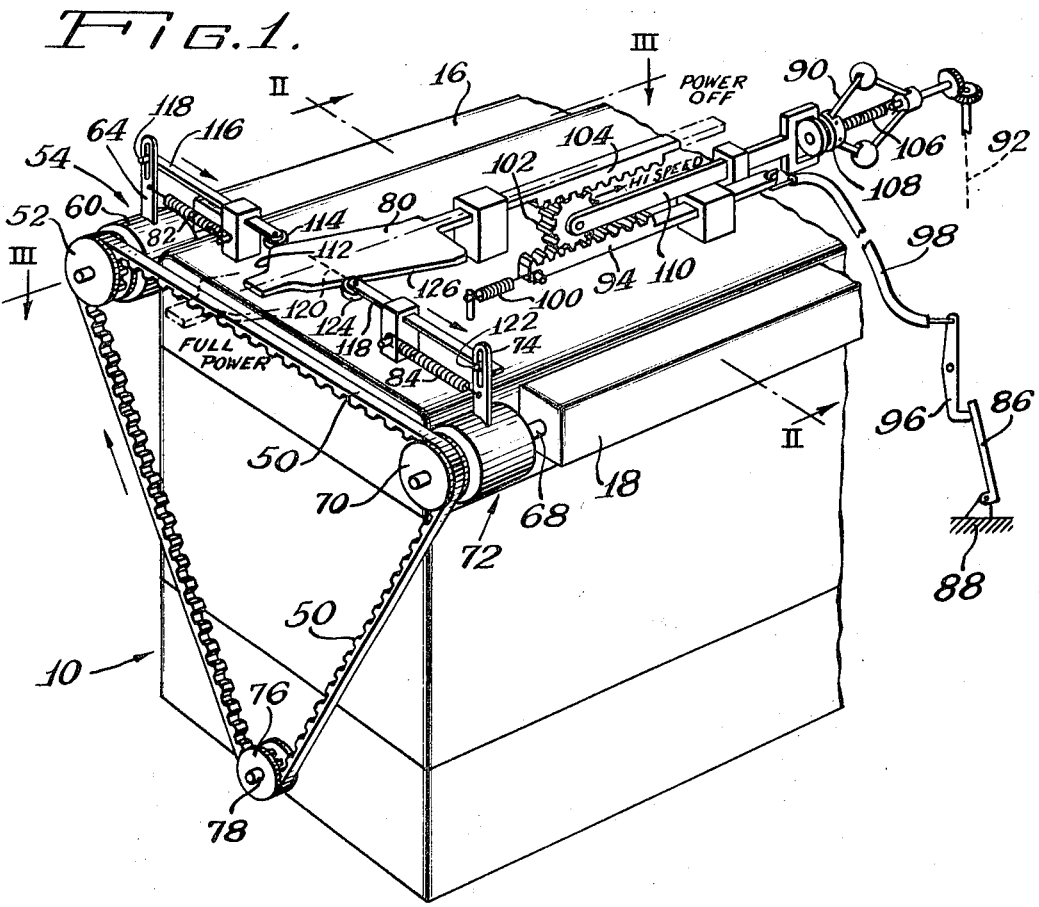
FIGURE 1 is an isometric view of a dual induction, in-line, four-stroke cycle, spark ignition, internal combustion engine embodying my invention.

More particularly in the multicylinder engine 10 as shown on each of the sheets of drawing, the combustion chamber 12 of each cylinder 14 (FIGURE 2) is fed through a dual induction system of manifolding comprising a first generally longitudinally extending intake manifold 16 at one side of the engine and a second generally longitudinally extending intake manifold 18 at the other side of the engine. Due to pressure differential caused during the suction stroke of the individual reciprocating pistons 20 in the respective cylinders 14 of the engine, plain air is drawn from an air filter 22 into a first path leading through the first manifold 16, an inlet passage 24 in the head of the engine, and thence through a port opening 26 and into the combustion chamber 12.

A second alternative path for air during the suction stroke leads from another air filter 28, through suitable fuel-introducing means such as a carburetor 30 which can be of the side draft type, the second manifold 18, an inlet passage 32, and thence through a port opening 34 and into the combustion chamber 12. A set of conventional poppet valves 36 controls the opening and closing of the port openings 26 and 34 which form the respective valve seats.

The valve gear includes a rocker arm 38, a valve bridge 40 common to the set of valves to synchronize operation thereof by the rocker arm 38, and a push rod 42 operated in the usual way by an engine camshaft which is driven at one-half crankshaft speed so as to open the valves 36 toward the end of the piston exhaust stroke and to close the valves 36 just past the start of the compression stroke. The closing force is provided by conventional valve-return springs 44.

At a location therein adjacent the mouth of the inlet passage, the first manifold 16 contains a co-axial set or series of internally passaged rotary valves 46, 46a, 46b, and so forth, and the second intake manifold 18 contains a similar series of rotary valves including the valve 48 for the individual No. 1 cylinder. In the interests of brevity, only the set of rotary valving in the first manifold 16 will be described.

Figure 3:
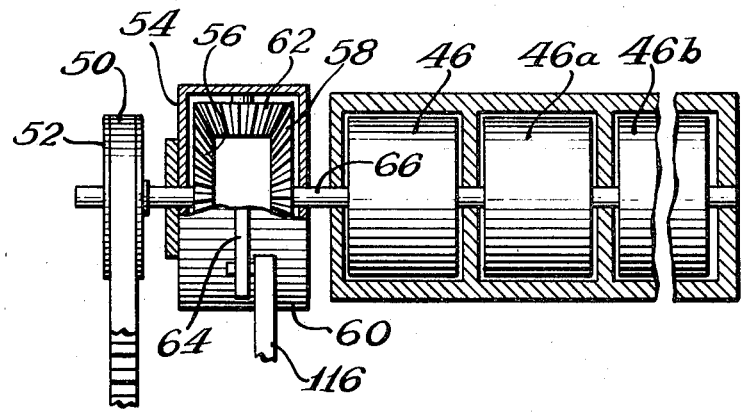
FIGURE 3 is a top plan view of the rotary type plain air valving shown in FIGURE 1, and being in longitudinal section as taken along the lines III—III in FIGURE 1.

In FIGURE 3, a cogged V-belt 50 turns an input sheave 52 which, through a differential gearing drive 54, rotates the valves 46, 46a, and so forth, in synchronism although not in phase with one another. The gearing drive 54 includes an input bevel gear 56, an output bevel gear 58 of the same diameter which is connected to the rotary valves, and controllable reaction means including a rocking carrier housing 60 and a set of bevel pinions 62 carried by the carrier housing and meshing with both gears 56 and 58. A radial adjusting arm 64 is rigid with and pivots with the housing 60 for advancing and retarding the time at which the valves such as the valve 46 closes relative to, and generally during, the piston suction stroke.

The valves 46, 46a, and so forth, are made fast to a common shaft 66 and, similarly, the valves 48 and so forth are fast to a common shaft 68. The drive to the latter is a like drive from the common belt 50, through a similar sheave 70, and thence to a differential gearing drive 72. The rocking carrier housing of the drive 72 rigidly carries a radial adjusting arm 74. The difference in the two air flows is that the second manifold 18 supplies carburetted air through the manifold rotary valves, which carburetted air is a pre-mix in the proportions of, say, 14 to 1 air to fuel so as to be precisely inside the combustible range.

The belt 50 is trained over both sheaves 52 and 70, and also over a drive sheave 76 which has half as many teeth as each of the sheaves 52 and 70. The drive sheave 76 is made fast to the crankshaft 78 of the engine so that, with zero belt slippage, the cogged V-belt 50 drives the sets of rotary valves always at one-half crankshaft speed, i.e., the same as camshaft speed.

Figure 2:
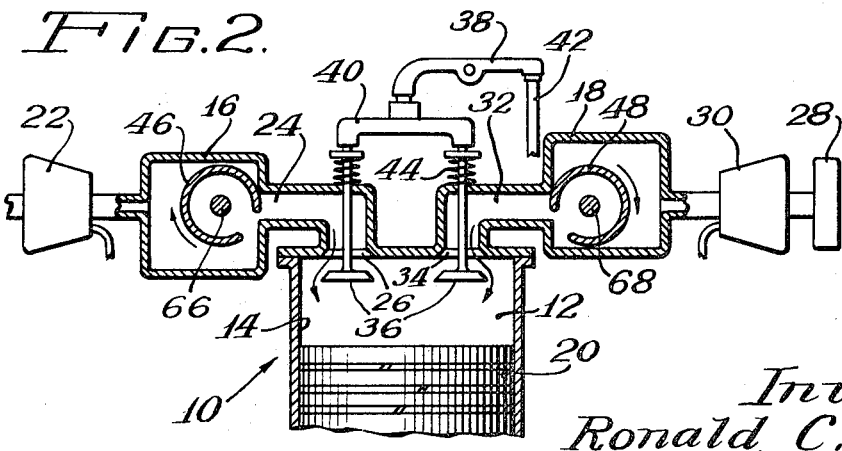
FIGURE 2 is a front elevational view in transverse section through the engine, taken along the lines II—II in FIGURE 1.

In the simplified showing of the sets of valves in FIGURE 2, one valve 36 of the set of poppet valves is seen to be located at the inner end of the individual inlet passage 24, and the rotary valve 46 is located at the outer end for controlling admission to the passage. Similarly, the rotary valve 48 is shown at the outer end of the individual inlet passage 32 and one valve 36 of the set of poppet valves is at the inner end in control of discharge from the passage 32. In practice, the sets of rotary valves can be in other locations relative to the poppet valves although it is desirable to have both sets as close to one another as feasible.

The arms 64 and 74 (FIGURE 1) have a common vertical plane of rotation transverse to the engine 10. The angular position of the arm 64 is controlled by a cam plate 80 and a first tension spring 82, and the angular position of the arm 74 is controlled by the same cam plate 80 and a second tension spring 84. The cam plate 80 advancingly and retractively moves in a longitudinal path of reciprocation above the engine. The cam plate 80 is controlled by a pivoted accelerator pedal 86 in a vehicle 88 propelled by the engine, and by a flyweight type governor 90 driven from the engine by means of bevel gearing and a crankshaft-connected or camshaft-connected shaft 92.

More specifically, the pedal 86 is mechanically connected to an operator rack 94 in a path leading from the toe of the pedal 86, through a reversing link 96 which pivots about a fixed axis through its midportion, and thence to a Bowden cable 98 which is pivotally connected to the rear end of the rack 94. A tension spring 100 is connected to and pulls forwardly on the front end of the rack 94.

The operator rack 94 is mechanically connected to the cam plate 80 in a path leading therefrom through an operator pinion 102, and thence to a meshing comparator rack 104 which is connected to the rear end of the cam plate 80.

The governor 90 is connected to the operator pinion 102 between the racks in a path leading from a movable, speed sensitive output member 108 thereof and thence to a longitudinally adjustable pinion fork 110 which rotatably carries the operator pinion 102.

The cam plate 80 is mechanically connected to the arm 64 in a path leading from a first cam surface 112 on the plate, through a roller follower 114, and thence to a laterally reciprocable advance/retard, reaction pushbar 116 which rotatably carries the follower 114 and which has a pin and slot connection 118 to the outer end of the radial adjusting arm 64.

A similar laterally reciprocable advance-retard, reaction pushbar 118 is aligned on a coaxis 120 with pushbar 116. The pushbar 118 is likewise connected at the side of the engine by a pin and slot connection 122 to the radial adjusting arm 74, and by a roller follower 124 to a second cam surface 126 which is on the cam plate 80 at that side of the engine.

Engine operating conditions will now be discussed, with the engine as viewed in FIGURE 1 being assumed to be operating with counterclockwise crankshaft rotation and cog belt circulation, the motion of the latter being in the direction indicated by an arrow. Advancement in timing of the rotary valve operation is accomplished by clockwise rotation of the radial arms 64 and 74, and the corresponding timing advance movement of the reaction pushbars 116 and 118 is in the rightward transverse direction indicated by arrows in FIGURE 1.

*Engine braking*

Figure 4:
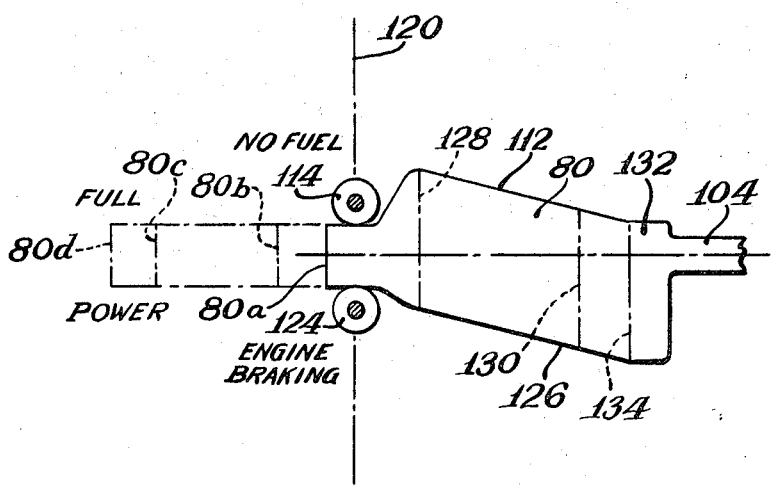
FIGURE 4 is a view in top plan of a detail shown in FIGURE 1, but with the rest of the showing omitted for clarity.

In the engine braking setting of the cam plate 80 in which it is fully retracted as shown by solid lines in FIGURE 4, a narrow, parallel-sided, front continuation or prolongation of the cam plate occupies the solid line position 80a, located in the vertical plane containing the common axis 120 on which the followers 114 and 124 reciprocate. The purpose is twofold. Of primary importance, the quantity of plain air taken into each cylinder requires being reduced which is accomplished simply by an appropriate change of the period of piston motion in which the valve 46, for example, is open. Specifically in this retracted, overtravel setting of the cam plate in which the prolongation 80 is active, the corresponding section of the cam surface 80a operatively causes the phase of plain air induction to be advanced to the point that the valve 46 closes just before the set of poppet valves 36 begins to open in their regular way at or adjacent the start of the suction stroke.

Equally importantly, the quantity of carburetted air taken into each cylinder is being reduced by an appropriate change of the period of piston motion in which the valve 48, for example, is open. Specifically in the retracted, overtravel setting of the cam plate 80, the cam surface 112 of the prolongation 80a operatively retards the phase of carburetted air induction so that the valve 48, for example, opens slightly after the set of poppet valves 36 has already closed in the regular way. This particular overtravel setting of the cam plate 80 producing maximum engine braking occurs when maximum deceleration is required and with the accelerator pedal 86 fully released.

The piston 20 thus draws against a vacuum in its unfed cylinder on each suction stroke and the piston 20 again draws against a vacuum on each firing stroke in the cycle, with an overall effect of providing engine braking despite the fact that the engine is basically unthrottled. It should be pointed out that the so-called engine "compression," which is generally but erroneously considered to provide engine braking in vehicles, is a misnomer in in throttled engines of conventional type and, it goes without saying, is equally a misnomer if applied to the present engine. Actually, it is mainly engine vacuum which causes an engine to effectively dissipate the energy which the traction wheels of a vehicle transmit during coasting as, for example, during movement of the vehicle down a slope.

Engine idling

Under conditions of full release of the accelerator pedal, all except when coasting, the cam plate 80 seeks an idle setting in the normal operating range of travel. So despite the fact that the pedal 86 during idling condition permits operation of the spring with its tendency to draw the operator rack 94 to an extreme forward setting, and despite the fact that the cam plate 80 during any preceding coasting condition will have had the tendency to occupy the retracted, overtravel position shown in solid lines in FIGURE 4, the comparator rack 104 will, in the performance of its function of comparing the position of the operator rack 94 and the operator pinion 102, cause slight advancement of the cam plate 80.

Such advancement is from the noted overtravel position to a position at the start of the power operating range, in which second control portions of the surfaces 112 and 126 which align across a cam section 128 move into the plane of the axis 120 (FIGURE 4). That movement is attended by the governor 90 reaching a lower or idling speed, because in so doing it advances the output member 108 and the operator pinion 102 forwardly, and the comparator rack 104 likewise partially advances the cam plate 80.

The consequent idling setting of the cam plate causes the phase of plain air induction to have a large amount of retard and causes the phase of the carburetted air induction to have a small amount of advance, allowing fuel consumption in the system but at an appreciably restricted rate. The engine receives fuel only sufficient for a low idling speed, without power. The corresponding position of the prolongation of the cam plate is shown by the broken lines 80b in FIGURE 4.

Intermediate power

In one of the intermediate power settings of the comparator rack 104, third control portions of the cam surfaces 112 and 126 which are aligned across a cam section 130 occupy the plane of the axis 120 at the time when the front prolongation of the cam plate occupies the broken line position shown by the broken lines 80c.

The intermediate power condition within the engine is illustrated in FIGURE 2, which shows that the rotary valves 46 and 48 are at a transition point of switchover in which the combustion chamber 12 switches over from drawing plain air from the first manifold 16 to drawing carburetted air from the second manifold 18. A slight valve overlap is desirable, i.e., the valve 46 is still closing when the valve 48 starts to open. It is evident that the piston end of the cylinder 14 will have a filling of plain air whereas the head end of the cylinder 14 will have a filling of carburetted air when the combustion chamber 12 reaches maximum size. So spark ignition and combustion within the pre-mix portion occupying the outer end of the chamber will occur in the regular way whereas the plain air in the balance of the chamber will provide an excess of oxygen tending to insure complete combustion of the fuel. At all events, the addition of heat to the portion of plain air will expand it, thus contributing to the overall increase of pressure and volume in the desired way.

Each cylinder is completely full on every effective suction or filling stroke thereof, and the air enters the cylinders under substantially the same pressure regardless of the plain air/carburetted air proportions. Therefore, the partial power operation afforded by the present fuel control is marked with greatly increased efficiency compared to prior engines because of the elimination of throttled air being drawn into the cylinders.

Full power

In an advanced overtravel setting of the comparator rack 104, a rear continuation or prolongation 132 of the cam plate 80 occupies a position between the rollers 114 and 124 in the vertical plane containing the axis 120. The cam surfaces 112 and 126 on the prolongation 132 operatively advance the phase of plain air induction and operatively advance the phase of carburetted air induction such that the rotary valve 46, for example, remains fully closed throughout suction and the rotary valve 48 is continuously open throughout suction. Hence, the cylinder 14 will receive a charge entirely of carburetted air when the combustion chamber 12 reaches maximum volume.

In this respect, the engine performs the same as a comparable throttle-operated internal combustion engine under wide-open throttle conditions.

As long as the operator pinion 102 has an unsatisfied or underspeed, full power position relative to the operator rack 94, there will be a speed error in existence between actual and desired engine speeds and the rear prolongation 132 will intervene between the roller followers 114 and 124. But when the accelerating governor flyweights in the governor 90 separate to a stabilized, full speed position, the output member 108 readjusts the comparator rack 104 and the cam plate 80 to a point that the control portions of the cam surfaces 112 and 126 which are aligned with one another across a section 134 of the cam plate take the intervening position.

Excluding overtravel then, the cam sections 128 and 134 represent the extreme active portions of the cam plate 80 so far as its normal range of travel is concerned. The corresponding positions of the front prolongation are shown by the dotted lines 80b (idle) and the dotted lines 80d (full power) which represent the respective ends of the normal range of travel.

Deceleration: governor reaction

In contrast to the fuel increasing function which the governor automatically performs in reaching the on-speed condition at engine idle, so as to prevent the engine from dying after the coasting vehicle has decelerated down to a speed corresponding to the engine idling speed, the governor generally has an opposite function during deceleration.

Specifically, if the pedal 86 is released sufficiently that it moves from a 70% depressed-70% power position into a 20% depressed-20% power position, the operator pinion 102 is temporarily held against shifting by the governor and so the operator rack 94 causes the comparator rack 104 to approach or take a retracted overtravel setting of reduced fuel or no fuel for the time being. The engine tends to respond quickly, and the consequent deceleration of the vehicle subsequently enables the governor flyweights to partially collapse so that, as the speed error decreases, the operator pinion 102 gradually moves forward to advancingly restore the cam plate 80 into a power providing position. Then when the governor 90 takes a satisfied or on-speed setting, the setting of the cam plate 80 will exactly correspond to the setting required by the pedal 86.

Acceleration: governor reaction

In distinction to the noted retracting function which the governor automatically performs when it accelerates into the on-speed setting at full power, thereby maintaining the cam plate 80 within but at the extreme high end of the normal operating range, the governor has an important fuel increasing function which it performs as long as a speed error exists during acceleration.

Specifically if the pedal 86 is advanced by foot from a 20% depressed-20% power position to a 70% depressed-70% power position, the movement is directly transferred by the operator rack 94 to produce that same amount of movement (movement of advance) in the comparator rack 104 and in the cam plate 80. The reason is that the output member 108 of the governor restrains the position of the operator pinion 102 until engine acceleration can cause the governor flyweights to further separate. Accordingly, the cam plate 80 over-advances into a greater power setting than called for by the accelerator pedal 86 and the excessive travel is proportional to governor speed error.

It is only after the governor 90 is on-speed that the cam plate 80 will have been retracted thereby and have taken a satisfied setting corresponding to the power setting of the pedal 86. So the acceleration response can be characterized as rapid.

Four stroke cycle

During idling or when operating at full power or at intermediate power settings each cylinder will, in two stages during its effective suction action which lasts slightly more than 180° of crankshaft rotation, draw in the plain air until switch-over and then carburetted air thereafter according to the proportioning required.

The second stroke is compression, lasting about 180° of crankshaft rotation and reducing volume in the combustion chamber until the same magnitude of compression pressure is reached irrespective of the plain air/fuel air proportions. A spark plug, not shown, discharges a firing spark in the charge in the regular way.

The firing stroke next transpires through about 180° of crankshaft rotation, the firing pressure and energy input depending upon proportions of the charge in the cylinder.

In completing the cycle, the exhaust stroke lasts approximately 180° of crankshaft rotation and is attended by actuating one or more conventional exhaust valves (not shown) which first open the cylinder head toward the end of the firing stroke and which keep the cylinder head open to an exhaust manifold until slightly past commencement of the next suction stroke, which starts repeating the cycle.

The set of intake poppet valves 36 and exhaust valves operate in unvarying timed fashion for admission of the combustible charge and exhaust of combustion products.

The set of intake poppet valves 36 further function to prevent backfiring and to protect the set of rotary valves which are open and otherwise vulnerable to damage many times when the valves 36 are closed.

Energy dissipation

Turning the present engine when each cylinder is being prevented, as described, from being fed enables the engine to dissipate energy on each of two successive strokes in the cycle. For the major part of the "firing" stroke, the piston works against a vacuum in the cylinder and the power, thus lost, which is required to do that work and which is taken from the crankshaft in the rotating mechanism is never regained in the system.

In the minor (terminal) part of the firing stroke, actuation of the exhaust valves causes intercommunication between the exhaust manifold and the large, high vacuum volume of the combustion chamber which is at or approaching maximum size. So the combustion chamber freely fills with air, and more energy dissipation occurs. That is to say, the piston then devotes its "exhaust" stroke to pump work in reversing the flow of the encroaching air and re-emptying the contents of the cylinder through the exhaust valves.

As herein disclosed, the engine is described as operating on a four stroke cycle with readily identified, separate strokes. It is evident that the fuel control hereof has equal application to rotary engines embodying a variable volume chamber which rotates during suction and which does not possess such well defined strokes, e.g., the suction stroke. Also the invention can equally well be employed with either a reciprocating or rotary two-cycle engine.

The opposing cam surfaces 112 and 126 are formed and utilized to provide many varying functions as herein shown but, self-evidently, fewer than all of those functions if desired can be utilized in a proper mechanism. Instead, the governor at times can be disabled to eliminate any unwanted effect, or its effect can be modified by adding to or modifying the cam surfaces in situations where governor action is undesired. Finally, a major advantage resides in the omission herefrom of any throttling orifice in the inlet air paths, because a constant compression ratio can presently be maintained irrespective of engine load.

However, a throttle for part time use may be provided, for example, for use only under idling or braking conditions or both. Conceivably, the use of a throttle can produce a smoother engine idle, if an overall richer charge is provided and introduced through a throttling orifice so as to maintain an appropriate speed for idling purposes.

From the foregoing, it can be appreciated that the interaction between the accelerator pedal and governor hereof affords to the driver of a vehicle a significant engine braking capability when he is coasting, and enhanced acceleration and deceleration when operating between or toward points in the normal power range.

Variations within the spirit and scope of the invention described are equally comprehended by the foregoing description.

What is claimed is:
1. Fuel control for a plain-and-carburetted dual-air-induction system of an unthrottled engine comprising a carburetor, and further comprising means adjustable for coordinately timing the supply of air from a source of plain air and the supply of fuel/air from the carburetor to the engine, said fuel control including, in combination with said means:
   a variably positionable control operator;
   a cooperating operator positioned according to magnitude of engine speed; and
   a comparator interconnecting the operators and said means, effective for comparing positions between the operators so as to assume settings adjusting said means as a function of both the actual and desired engine speeds.
2. The invention of claim 1, in combination with said engine:
   said engine having a combustion chamber and a piston movable therein; and
   air inlet passages forming separate connections between the combustion chamber and each of the plain air and fuel/air supplies;
   each air inlet passage including a conventional air intake valve connected in that passage and opening and closing same when the piston is at particular positions in the combustion chamber, and an associated valve means responsive to the piston position for opening and closing that inlet passage independently of the opening and closing of that passage by the air intake valve;
   said timing means including the valve means in each air inlet passage and having advance/retard connections to a plurality of the valve means.
3. The invention of claim 2, characterized by:
   said connections to each of the valve means being separate so as to independently vary the period of piston motion at which each valve means opens and closes its associated air inlet passage.
4. The invention of claim 3, characterized by:
   the connections having positions of relative advance and relative retard referenced to suction motion of the piston;
   the positions of said connections corresponding to the timing adjustment of the timing means, effective to cause the plain air valve means to close its associated air inlet passage and the fuel/air valve means to open its associated air inlet passage at substantially the same points of relative timing advance in the suction motion and with sufficient valve overlap to combine the air flows at those points.
5. Fuel system for a dual-induction spark-ignition engine, having a set of switchover valving in communication with, and adapted to communicate, plain air to the engine up to a switchover point partway through a suction stroke, and carburetted air to the engine during at least the balance of that stroke, said fuel system including, in combination with the switchover valving:
control mechanism comprising an operator positioned manually;
a cooperating operator positioned according to magnitude of speed; and
a comparator interconnecting the operators and the set of switchover valving effective for comparing positions between the operators so as to assume settings adjusting the time of switchover of the set of valving as a function of both the actual and desired engine speeds.

6. The invention of claim 5, the interconnection of the comparator among the operators and the set of switchover valving characterized by:
the comparator having cam means carried thereby;
the set of switchover valving having timing advance mechanism controlling same; and
means cammed by said cam means and adjusting the timing advance mechanism so as generally but not always to advance the time of close-off of the plain air and advance the time of opening of the carburetted air sumultaneously, whereby the switchover valving will switch over earlier in the suction stroke, increasing engine power.

7. The invention of claim 6, in combination with said engine:
said set of valving comprising rotary, engine air intake valves;
said engine providing a synchronized drive common to the rotary valves;
said timing advance mechanism comprising gearing separately connecting each rotary valve and the drive;
said cammed means comprising reaction members individual to the rotary valves;
the cam means comprising cams on the comparator individual to the rotary valves and effective with the positioning of the comparator in one setting to oppositely cam the cammed means so that the reaction members and gearing take substantially extreme settings simultaneously, causing increased advancement of the time of close-off of the plain air and reduced advancement of the time of opening of the carburetted air during each suction stroke, to increase engine braking.

8. Fuel system for a dual induction engine for vehicles having one separate intake manifolding means on the engine through which plain air is supplied if at all on a suction stroke, and another separate intake manifolding means on the engine through which carburetted air is supplied during the remainder of each such stroke at a variably timed point where the plain air flow is discontinued, said fuel system including, in combination with the separate manifolding means:
fuel control mechanism comprising an operator positioned manually;
a cooperating operator positioned according to magnitude of speed;
sequentially operating sets of timed induction valving connected in different ones of the manifolding means operative generally but not necessarily to switchover from induction of the plain air to carburetted air at said timed point during the suction stroke; and a comparator interconnecting the operators and at least one set of the valving effective for comparing positions between the operators so as to assume settings adjusting the time of switchover of the valving as a function of both the actual and desired engine speeds.

9. The invention of claim 8, characterized by:
the comparator being connected by connection means to said one set of valving effective for adjusting same into an overlapping phased relation, with the valve overlap combining the flows of plain and carburetted air at the transition point during switchover.

10. The invention of claim 9:
the connection means characterized by advance/retard connections from the one set of valving to separate portions of the comparator, said separate portions comprising first control sections of said comparator effective in an overtravel setting of the latter for operatively advancing the phase of plain air induction and retarding the phase of carburetted air induction to a point substantially discontinuing the supply of air during the suction stroke.

11. The invention of claim 10:
the separate portions characterized by second control sections of said comparator effective in an idling setting of the latter for retarding the phase of plain air induction to the point of a large amount of retard and advancing the phase of the carburetted air induction to the point of only a small amount of advance, thereby appreciably restricting the fuel consumption in said system.

12. The invention of claim 11:
the separate portions further characterized by third control sections of said comparator effective in the range of power settings of the latter corresponding to various partial and full amounts of engine power, for causing the plain and carburetted air to be respectively inducted under conditions of that amount of advance.

13. Fuel control for a plain-and-carburetted dual-air-induction system of an unthrottled engine having a carburetor, and further having means for coordinately timing the supply of air from a source of plain air and the supply of fuel/air from the carburetor to the engine, said fuel control including, in combination with said means:
an operator positioned manually;
a cooperating operator positioned according to magnitude of engine speed; and
a comparator interconnecting the operators and said means, effective for comparing positions between the operators so as to assume settings adjusting said means as a function of both the actual and desired engine speeds.

References Cited

UNITED STATES PATENTS

| 838,399 | 12/1906 | Greuter | 123—97 |
| 1,076,268 | 10/1913 | Carpenter | 123—100 |
| 1,330,024 | 2/1920 | Hodges | 123—100 |
| 1,687,082 | 10/1928 | Cole. | |
| 3,170,445 | 2/1965 | Folcke | 123—119 X |
| 3,203,409 | 8/1965 | Allen. | |

FOREIGN PATENTS

| 173,585 | 6/1952 | Austria. |
| 542,044 | 8/1922 | France. |
| 178,645 | 10/1935 | Switzerland. |

AL LAWRENCE SMITH, *Primary Examiner.*

U.S. Cl. X.R.

123—100, 119, 97